United States Patent [19]
Spillers

[11] 3,862,868
[45] Jan. 28, 1975

[54] FILAMENT REINFORCED FILM

[75] Inventor: Frank Wayne Spillers, Lake Jackson, Tex.

[73] Assignee: The Dow Chemical Company, Midland, Mich.

[22] Filed: Sept. 25, 1972

[21] Appl. No.: 291,811

[52] U.S. Cl. ............... 156/244, 156/290, 264/95, 264/96, 264/173, 264/209, 264/210 R, 264/277
[51] Int. Cl. ...... B29d 23/05, B29f 3/10, B29c 17/07
[58] Field of Search ....... 264/95, 96, 171, 173, 271, 264/279, 277, 209, 210 R; 156/244, 178, 179, 290; 229/55

[56] References Cited
UNITED STATES PATENTS

| | | | |
|---|---|---|---|
| 2,563,397 | 8/1951 | Colombo | 264/173 |
| 2,773,285 | 12/1956 | Piazze et al. | 264/209 |
| 3,004,286 | 10/1961 | Klein | 264/173 |
| 3,286,005 | 11/1966 | Cook | 264/95 |
| 3,370,999 | 2/1968 | Schwarzrock | 264/95 |
| 3,417,675 | 12/1968 | Ausnit | 264/173 |
| 3,454,441 | 7/1969 | Spruyt | 156/244 |
| 3,589,958 | 6/1971 | Schrenk | 264/95 |

*Primary Examiner*—Jeffery R. Thurlow
*Attorney, Agent, or Firm*—Robert B. Ingraham

[57] ABSTRACT

Filament reinforced film is produced by extruding a polymer in tubular form and including within the extruded polymer longitudinal reinforcing filaments and inflating or stretching the tube by means of gas disposed therein. The product is useful for bags such as trash bags, grocery bags and the like.

4 Claims, 4 Drawing Figures

PATENTED JAN 28 1975
3,862,868
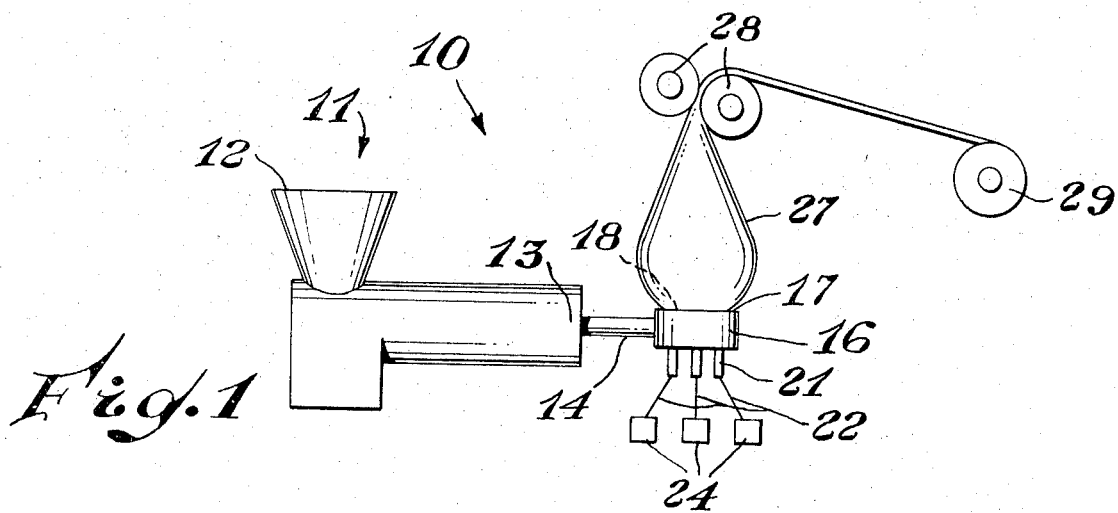
Fig. 1
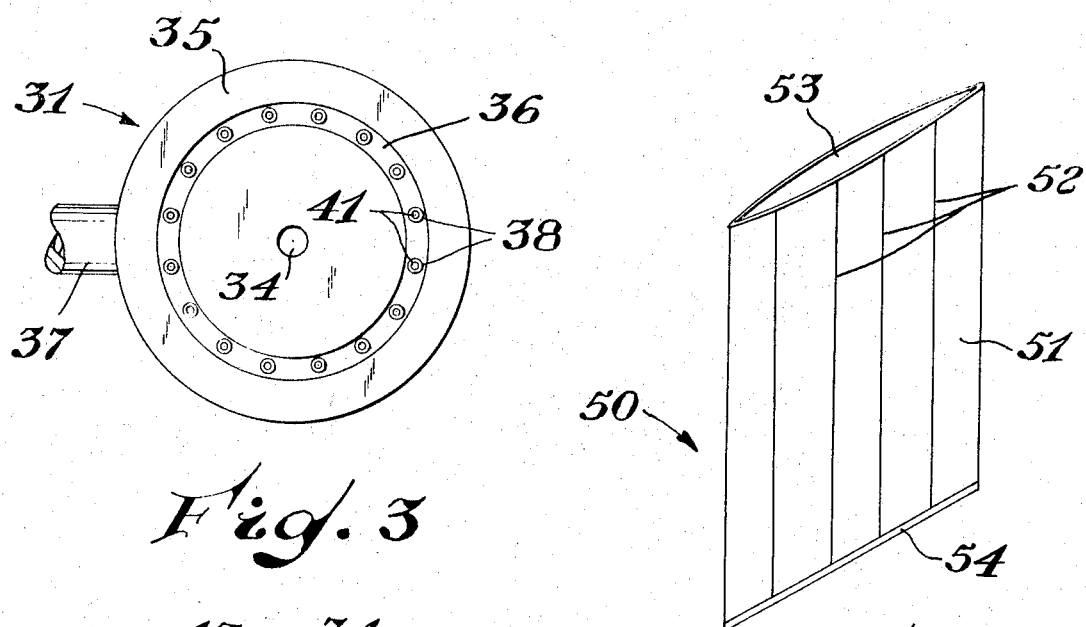
Fig. 3
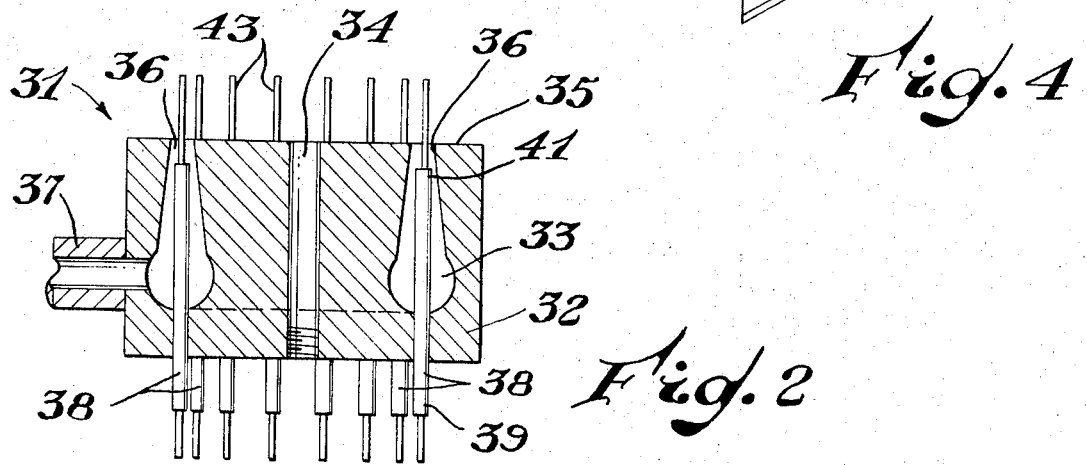
Fig. 4
Fig. 2

FILAMENT REINFORCED FILM

Bags made from plastic film are increasing in popularity. Such bags in a variety of sizes are used for many purposes. Many such bags, particularly the larger sizes, are employed as trash or garbage bags. Such bags, in general, have a wall thickness from about 2 to 4 mils and in many instances are satisfactory for the disposal of lightweight refuse and the like. Oftentimes such bags are subjected to an excessive internal load and perforate or tear on being handled. Plastic bags at the present time are not widely employed for such applications as grocery bags. Generally such plastic bags do not economically compete with paper bags if the plastic bags are prepared in such a manner to have the required strength to resist the heavy loadings often encountered in grocery service.

It would be desirable if there were available an improved synthetic resinous thermoplastic bag and a method for the preparation thereof.

It would also be desirable if there were available an improved method and apparatus for the preparation of lightweight tubing for the preparation of bags.

These features and other advantages in accordance with the present invention are achieved in a method for the preparation of synthetic resinous tubing wherein a heat plastified synthetic resinous material is extruded from an annular die in the form of a hollow tube, the tube inflated by means of internal fluid pressure to a diameter greater than the diameter of the annular orifice and the tubing subsequently collapsed, the improvement which comprises including within the heat plastified synthetic resinous thermoplastic material within the die and prior to extrusion from the annular orifice, a plurality of filamentary reinforcing members encapsulated within the melt.

Also contemplated within the scope of the present invention is an improved bag, the bag comprising a flattened tubular body portion consisting essentially of a flattened cylindrical portion of an extruded tube, the bag having a first or open end and a second or closed end, a plurality of filamentary reinforcing elements encapsulated within the tubing, the reinforcing elements extending from the first end of the bag to the second end of said bag, with the further limitation that no further reinforcing elements are encapsulated within the wall of said bag.

Further features and advantages of the present invention will become more apparent from the following specification when taken in connection with the drawing wherein:

FIG. 1 schematically depicts an apparatus for the practice of the method of the present invention.

FIG. 2 is a sectional schematic representation of a die such as is used as the apparatus in FIG. 1.

FIG. 3 is a plan view of the die shown in FIG. 2.

FIG. 4 is a schematic representation of a bag in accordance with the present invention.

In FIG. 1 there is schematically represented an apparatus generally designated by the reference numeral 10 useful for the practice of the present invention. The apparatus 10 comprises in cooperative combination a source of extrudable synthetic resinous thermoplastic heat plastified film forming material generally designated by the reference numeral 11. The source 11 beneficially is a conventional screw extruder. The source 11 has an inlet end 12 and an outlet or discharge end 13. Heat plastified synthetic resinous thermoplastic material is supplied to the discharge end 13. A conduit 14 is operatively affixed to the discharge end 13 of the source 11 and is adapted to receive heat plastified thermoplastic material therefrom. A die 16 is in operative engagement with the conduit 14 and is adapted to receive heat plastified material therefrom. The die 16 has an extrusion or die face 17 defining a generally annular extrusion orifice 18. A plurality of tubes or filament conduits 21 are in operative association with the die 16. The conduits 21 provide a passage extending from space exterior to the die 16 to space within the die 16 which contains heat plastified synthetic resinous thermoplastic material. Each of the conduits 21 has disposed therein a reinforcing filament 22. Beneficially the filaments 22 are of the material of a higher strength than the thermoplastic material at ambient conditions. Beneficially, for many applications, suitable reinforcing filaments include glass fibers in the form of roving, small yarns and the like, synthetic resinous films which are molecularly oriented to provide high strength and are not de-oriented or weakened by being passed into contact with the heat plastified synthetic resin in the die 16. The filaments 22 are provided from a plurality of reinforcing material sources 24. A generally tubular bubble 27 is discharged from the extrusion orifice 18. The bubble 27 is distended by means of an internal fluid pressure such as air to provide the bubble or tube with diameter substantially greater than the diameter of the annular extrusion orifice 18. The bubble 27 is subsequently cooled, flattened and passed between nip or pressure rolls 28 and wound upon a roll 29.

In FIG. 2 there is schematically illustrated a die suitable for the practice of the present invention generally designated by the reference numeral 31. The die 31 comprises a die body 32 defining a generally annular internal plenum 33 and a centrally disposed inflating gas passage 34. The die body 32 has a die face 35. In the die face 35 is defined a generally annular extrusion orifice 36 in full communication with the plenum 33. The die 31 defines a polymer or plastic supply passageway 36a in operative communication with a supply conduit 37 such as the conduit 14 of FIG. 1. A plurality of conduits 38 are disposed at least partially within the die body 32. The conduits 38 have first or inlet ends 39 and second or discharge ends 41. The inlet ends 39 are disposed external to the die body 31 and the discharge ends 41 are disposed generally within the plenum 33 and generally adjacent the annular extrusion orifice 36. A plurality of reinforcing filaments 43 are shown extending through the conduits 38 and emerging from the annular orifice 36.

FIG. 3 depicts a view of the die 31 showing the die face 35, the annular orifice 36, the conduits 38 and their discharge ends 41 arranged within the die plenum.

In operation of the die as depicted in FIGS. 1 and 2, heat plastified thermoplastic material enters the die from the conduit 37 through the passageway 36a, flows about the plenum 33 and upwardly through the annular extrusion orifice 36. Prior to extrusion of the resin, reinforcing filaments such as the filaments 43 are disposed within the conduits 38. Frictional engagement of the filaments by the molten thermoplastic material causes the filaments to be drawn through the annular extrusion orifice at a rate at least approximating the rate of extrusion of plastic melt therethrough. Beneficially, the resultant tube is subsequently inflated and passed to nip rolls such as the rolls 28. Once the extruded film is engaged by the rolls 28, some latitude exists between the extrusion speed and the lineal take-away speed. If it is desired to prepare a thinner film, the take-away rate of the rolls 28 is increased and if a thicker film is desired, the rate is decreased. The filaments are generally parallel and extend in the direction of extrusion.

The method of the present invention is operable with any extrudable synthetic resinous organic thermoplastic material which can be extruded to form a tubular film. Such materials are well known in the art and need not specifically be disclosed herein.

In FIG. 4 there is depicted a view of a bag or container in accordance with the present invention generally designated by the reference numeral 50. The bag 50 comprises a flattened tubular body portion 51 having a plurality of reinforcing filaments 52 encapsulated therein. The body 51 has a first or open end 53 and a second or closed end 54. Beneficially, the closed end such as the closed end 54 may be provided by any convenient means such as by transverse heat sealing of the extruded tube, subsequently severing the bag from the tube, or alternately, portions of the desired length may be cut from the tube and subsequently heat sealed or joined by adhesives, pressure sensitive adhesives, stitching or like means well known in the art.

By way of further illustration, an apparatus is employed which is generally as depicted in FIGS. 1 and 3. The die has 36 evenly spaced conduits or tubes such as the conduits 38 of FIGS. 2 and 3. Glass fiber yarns are passed through the tubes and molten polyethylene introduced into the die and extruded from the annular orifice. The resultant extruded tube is inflated by means of air supplied through a passageway located in the center of the die, the resultant tube inflated to a diameter of about 18 inches. The tube is cooled to a temperature below the thermoplastic temperature of the polyethylene and wound on a roll. Subsequently, the tube is unwound from the roll and a plurality of transverse heat seals are made in the tubing. The transverse seals are spaced about 28 inches apart. The tubing is subsequently severed in a direction parallel to the direction of the seals and at a location adjacent each seal to form a plurality of bags having a length of about 28 inches. The wall thickness of the bags is about 0.004 inch. The bags are evaluated for serviceability as trash bags and are found to be much more satisfactory than similar bags prepared without the filamentary reinforcing. Examination of the extruded reinforced tubing indicates that a substantially gas bubble-free product is obtained without a central region of weakness which results from lamination of two preformed films with reinforcing filaments therebetween.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. In a method for the preparation of synthetic resinous tubing wherein a heat plastified synthetic resinous material is extruded from an annular die in the form of a hollow tube having a wall, the tube inflated by means of internal fluid pressure to a diameter greater than the diameter of the annular orifice and the tubing subsequently collapsed, the improvement which comprises encapsulating within the heat plastified synthetic resinous thermoplastic material within the die and prior to extrusion from the annular orifice a plurality of generally parallel, generally evenly spaced continuous filamentary reinforcing members and the reinforcing members extending in the direction of extrusion and being encapsulated within the wall and maintained within the wall during expansion and collapses whereby a collapsed tube is obtained having filamentary reinforcement within the wall of the collapsed tube.

2. The method of claim 1 wherein the synthetic resinous material is a polyolefin.

3. The method of claim 1 wherein the filamentary reinforcing members are of glass fibers.

4. The method of claim 1 including the step of flattening the hollow tube and heat sealing portions of the hollow tube to provide a plurality of filamentary reinforced bags.

* * * * *